Patented Nov. 28, 1933

1,936,590

UNITED STATES PATENT OFFICE 1,936,590

MANUFACTURE OF CELLULOSE ESTERS

Henry Dreyfus, London, England

No Drawing. Application July 23, 1930, Serial No. 470,231, and in Great Britain August 2, 1929

15 Claims. (Cl. 260—101)

This invention is a continuation in part of prior U. S. application S. No. 301,927 and relates to new or improved processes for the manufacture of cellulose acetates or other cellulose esters, for example cellulose propionate, cellulose butyrate and the like.

In said U. S. application S. No. 301,927 I have described processes for the esterification of cellulose or cellulose-containing materials in presence of hydrochloric acid and one or more chlorides of iron, manganese, cobalt, nickel or copper, the acid and halide being in quantity not less than 2% on the weight of the cellulose, and I have further described processes in which the esterification is effected in presence of the corresponding bromides or iodides, and hydrobromic or hydriodic acid.

The said application refers to the use of proportions of the mixed catalysts from 2% upwards, and states that the preferable proportions are 5–10% of acid together with 5–10% of ferric chloride or the like, and further states that in order to avoid degradation of the cellulose molecule the esterification is preferably conducted at temperatures not exceeding 50° C.

I have now found that the catalysts of the said application, namely hydrochloric acid, hydrobromic acid or hydriodic acid in conjunction with halides, and particularly chlorides, of iron, manganese, cobalt, nickel, or copper, may be used in proportions of under 2% on the weight of the cellulose, good results being thereby obtainable. The present invention contemplates broadly the acetylation or other esterification in presence of the mixed catalysts of the said application, either or both of the mixed catalysts being present in a proportion of under 2% on the weight of the cellulose. For example, I may use a proportion of between 1 and 2% of the ferric chloride or other halide together with a proportion of 1 to 2% of hydrochloric acid or other hydrohalide acid, or alternatively, I may employ a proportion of 0.5 to 2% of ferric chloride or other halide in conjunction with more than 2% of hydrochloric acid or other acid, for example, proportions of 5, 10 or even 15% of acid. Or again, I may employ proportions of between 0 and 2% of hydrochloric or other acid in conjunction with more than 2% of ferric chloride or other halide, e. g. proportions of 5, 10, 15, 20, 30% or more.

As initial materials for acetylation or esterification cotton or other celluloses or near conversion products thereof may be employed, or wood pulps or bamboo, esparto, or other materials containing encrusting matter and from which the lignin, pentosan, resins and like constituents have been substantially removed, as for example in sulphite pulp, soda pulp, or sulphate pulp or other chemical wood pulps. The invention also contemplates the acetylation or other esterification of already esterified products or of cellulose ethers.

Fibres, fabrics or the like, for example of cotton or other natural cellulosic materials or of viscose artificial silk or of other regenerated cellulosic artificial fibres may likewise be acetylated or esterified by means of the present invention, and may retain their fibrous structure by carrying out the acetylation in suspension in presence of liquid diluents or in absence of liquid solvents or diluents as hereinafter described.

The best results are obtainable by subjecting the cellulosic materials to a pretreatment before the esterification to increase their reactivity. Such pretreatment may comprise a treatment with organic acids, and particularly with lower aliphatic acids, e. g. formic acid or acetic acid, in concentrated or dilute form, and in small or large quantities, the acid being applied in the liquid state, as described, for instance, in my French Specification No. 565,654, or in the vapour state, alone or mixed with inert gases as described in U. S. application S. No. 66,103. After the treatment with organic acids, the cellulosic materials may be subjected to a stream of air or other inert gas, or to suction or vacuum to remove the organic acids wholly or in part. Formic acid, except when employed only in small quantities should be substantially removed.

Another form of pretreatment which I have found effective is that described in my prior U. S. applications S. Nos. 328,306 and 348,981. According to these applications the cellulosic materials are subjected to a pretreatment with hydrochloric acid, hydrobromic acid or hydriodic acid, or mixtures thereof in a quantity (calculated as hydrogen halide) not substantially exceeding 50% on the weight of the cellulose. Alternatively, halide salts and particularly ferric, stannic, cobalt, nickel, manganese and copper chlorides, may be employed for the pretreatment. The hydrohalide acids may be used in admixture with the halide salts, or a pretreatment with either or both may be applied in conjunction, i. e. simultaneously or separately, with a pretreatment with organic acids, and particularly lower fatty acids, for example acetic acid or formic acid.

The pretreatment with the hydrohalide acids is preferably effected at ordinary temperatures, but it may be accelerated by the use of somewhat increased temperatures, though temperatures, concentrations or other conditions of treatment resulting in disintegration of the cellulose are preferably avoided. Though U. S. application S. No. 328,306 indicates that the hydrohalide acids should not be employed in a proportion (calculated as hydrogen halide) of less than 2% of the weight of the cellulose, I have now found that with such low proportions, e. g. between about 1 and 2%, good results are obtainable. A pretreatment with a halide, e. g. ferric chloride may likewise be effected at ordinary or increased temperatures, but in this case the temperature range is not so limited in practice, as these salts are less liable to give rise to degradation than the corresponding acids. Chemical wood pulps are preferably subjected to an alkaline purifying treatment followed by a pretreatment with organic acids, as described in U. S. Patent No. 1,711,110, or followed by a pretreatment with hydrohalide acids and/or halide salts and/or organic acids. The alkaline purifying treatment may, for example, be carried out with caustic alkali of low concentration, such as 3% or under, with heating or boiling, or with caustic alkali of relatively high concentration, such as 15–20%, in the cold or with only slight heating.

The temperature of the actual acetylation or esterification is preferably maintained sufficiently low to avoid any serious degradation of the cellulose, but with the reduced quantities of catalysts used according to the present invention higher temperatures may be attained in some cases without deleterious results than with the processes of U. S. application S. No. 301,927.

According to a modification, hydrohalide acid may be employed in conjunction with the halide salts during a part only of the esterification. For example the acid may be wholly or partly neutralized during the later stages of the esterification and at the same time or later the acid radicle of the halide catalyst may be wholly or partly neutralized so that the metal, e. g. iron, is present in an excess over the amount equivalent to the chloride or other acid radicle. In such a two or multistage process the temperature may vary with the individual stages, for example it may increase with decreasing acidity of the catalyst. Moreover the total amount of iron or other metal present may vary from stage to stage. The reaction may for example be started with small quantities of ferric chloride and hydrochloric acid, under 2% or up to 5%, and ferric oxide or hydroxide, preferably freshly prepared, be added from time to time. On the other hand when starting with relatively large quantities of halide and hydrohalide acid a progressive neutralization may take place by suitable addition of a neutralizing agent not containing iron or other metallic catalyst.

The esterification may be effected so that the ester is produced in solution, or may be effected in suspension in presence of a liquid diluent, or may be effected with the aid of vaporous esterifying agent, as described in U. S. application S. No. 72,403.

The acetates or other esters produced may, if desired, be subjected to processes of secondary treatment or ripening for the purpose of changing their solubilities. Such processes are preferably conducted in presence of the catalysts used in the acetylation or esterification itself, but if desired such catalysts may be separated and other ripening agents added. The ripening or further treatment may be carried out at ordinary temperatures or with slight heating, but results of particular value are obtainable by heating the ripening mixture to relatively high or high temperatures, e. g. up to 80 or 100° C. or more. In the case of such relatively high or high temperatures free mineral acidity is preferably avoided, for example by the addition to the mixture of sodium acetate or the like.

The acetates or other esters either as primary products or ripened, and in the primary esterification or ripening solutions or suspensions, or after separation therefrom, may be worked up into commercial products, such as artificial silks, fibres, or films, moulding powders, thermoplastic masses, moulded articles, sheets, etc.

The following examples show the best methods known to me for carrying the invention into effect but they are not to be considered as limiting the invention in any way:—

*Example 1*

100 parts of cotton cellulose are pretreated with formic acid, for example by treatment with 500 to 1000 parts or more of formic acid of about 85% strength, allowing to stand for some hours in the cold and hydroextracting or by impregnating with about 15 parts of formic acid of 75 to 85% strength and then allowing to stand for about 8 to 12 hours at ordinary temperature. If required the material may then be washed to remove the formic acid and centrifuged or dried. The pretreated material is then introduced into an acetylator containing a mixture of 600 parts of acetic acid, 400 parts of acetic anhydride, 15 parts of ferric chloride and 1 part of hydrochloric acid (calculated as HCl) either in the form of the fuming aqueous acid (33 to 35% strength) or in solution in the acetic acid, and the mass is stirred during the reaction which may be conducted at ordinary atmospheric temperature or at temperatures up to 50° C. When solution is complete the cellulose acetate may be precipitated therefrom or may be ripened to acetone solubility at any suitable temperature. Preferably for the ripening the hydrochloric acid is neutralized by addition of sodium acetate and the ripening is conducted at 80 to 100° C.

*Example 2*

100 parts of cotton cellulose are pretreated with 400 parts of glacial acetic acid to which has been added 5 to 10 parts of 35% aqueous hydrochloric acid. The pretreatment is carried out in the cold for about 2 hours after which the cellulose is acetylated by addition of a mixture containing a further 200 parts of glacial acetic acid, 400 parts of acetic anhydride and 1.5 parts of ferric chloride, the acetylation being carried out in the cold or with only slight heating until solution is complete. The cellulose acetate may be precipitated directly or ripened in the acetylation solution as described in Example 1.

*Example 3*

100 parts of cotton cellulose pretreated as in Example 1 are introduced in an acetylator into a mixture of 600 parts of acetic acid, 450 parts of acetic anhydride and 20 parts of crystallized ferric chloride and 5 parts of hydrochloric acid (calculated as HCl). The reaction is allowed to continue in the cold for about 2 hours, after which 5 parts of freshly precipitated ferric hydroxide are added. The reaction may thereafter be carried out at 30 to 50° C. until solution is complete, or after a further 2 or 3 hours a further 15 parts of freshly precipitated ferric hydroxide may be added and the acetylation completed at 50 to 70° C. The cellulose acetate may then be treated as in the preceding examples.

In the appended claims phrases indicating a certain quantity of hydrohalide acid are to be read as meaning that quantity of hydrochloric acid or of hydrobromic acid or of hydriodic acid or that quantity of a mixture of any two or more of these acids. Similarly phrases indicating a certain quantity of metallic halide are to be read as meaning that quantity of chloride, bromide or iodide of manganese, iron, cobalt, nickel, or copper or that quantity of a mixture of any two or more of these halides.

What I claim and desire to secure by Letters Patent is:—

1. Process for the production of cellulose esters, comprising esterifying materials consisting substantially of cellulose by means of acid anhydrides in presence of hydrohalide acid and of a halide of a metal selected from the group consisting of iron, manganese, cobalt, nickel and copper, at least one of said catalysts being present in a quantity less than 2% on the weight of the cellulose.

2. Process for the production of cellulose esters, comprising esterifying materials consisting substantially of cellulose by means of acid anhydrides in presence of hydrochloric acid and ferric chloride, at least one of said catalysts being present in a quantity less than 2% on the weight of the cellulose.

3. Process for the production of cellulose acetate, comprising acetylating materials consisting substantially of cellulose by means of acetic anhydride in presence of hydrochloric acid and ferric chloride, at least one of said catalysts being present in a quantity less than 2% on the weight of the cellulose.

4. Process for the production of cellulose acetate, comprising pretreating material consisting substantially of cellulose with an acid reagent and effecting acetylation by means of acetic anhydride in presence of hydrochloric acid and ferric chloride, at least one of said catalysts being present in a quantity less than 2% on the weight of the cellulose.

5. Process for the production of cellulose acetate, comprising pretreating material consisting substantially of cellulose with a lower fatty acid and effecting acetylation by means of acetic anhydride in presence of hydrochloric acid and ferric chloride, at least one of said catalysts being present in a quantity less than 2% on the weight of the cellulose.

6. Process for the production of cellulose acetate, comprising pretreating material consisting substantially of cellulose with hydrochloric acid and effecting acetylation by means of acetic anhydride in presence of hydrochloric acid and ferric chloride, at least one of said catalysts being present in a quantity less than 2% on the weight of the cellulose.

7. Process for the production of cellulose acetate, comprising pretreating chemical wood pulps with an alkaline purifying agent, pretreating with an acid reagent, and thereafter acetylating by means of acetic anhydride in presence of hydrochloric acid and ferric chloride, at least one of said catalysts being present in a quantity less than 2% on the weight of the cellulose.

8. Process for the production of cellulose acetate, comprising pretreating material consisting substantially of cellulose with an acid reagent, acetylating with acetic anhydride in presence of hydrochloric acid and ferric chloride, at least one of said catalysts being present in a quantity less than 2% on the weight of the cellulose, destroying excess acetic anhydride and ripening the cellulose acetate.

9. Process for the production of cellulose esters, comprising effecting esterification by means of acid anhydrides in presence of a halide of a metal selected from the group consisting of iron, manganese, cobalt, nickel and copper and a quantity of hydrohalide acid which is diminished during the esterification.

10. Process for the production of cellulose acetate, comprising effecting acetylation by means of acetic anhydride in presence of ferric chloride and a quantity of hydrochloric acid which is diminished during the acetylation.

11. Process for the production of cellulose acetate, comprising initiating an acetylation by means of acetic anhydride in presence of ferric chloride and hydrochloric acid and reducing the quantity of hydrochloric acid during the acetylation.

12. Process according to claim 11, in which the acidity is reduced by means of a basic ferric compound.

13. Process according to claim 11, wherein the acidity is reduced by means of ferric hydroxide.

14. Process for the production of cellulose acetate, comprising initiating the acetylation by means of acetic anhydride in presence of ferric chloride and hydrochloric acid and completing the acetylation in presence of ferric chloride alone.

15. Process for the production of cellulose acetate, comprising initiating the acetylation by means of acetic anhydride in presence of ferric chloride and hydrochloric acid and reducing the acidity during the acetylation until at the end of the acetylation the catalyst contains iron in the ferric form in quantity greater than is equivalent to the chloride present in the catalyst.

HENRY DREYFUS.